United States Patent

[11] 3,614,114

| [72] | Inventor | Henry A. Traub<br>Pacific Palisades, Calif. |
|---|---|---|
| [21] | Appl. No. | 841,372 |
| [22] | Filed | July 14, 1969 |
| [45] | Patented | Oct. 19, 1971 |
| [73] | Assignee | W. S. Shamban & Co.<br>West Los Angeles, Calif. |

[54] SEAL ASSEMBLY
18 Claims, 7 Drawing Figs.

[52] U.S. Cl. ..................................... 277/165,
 277/143, 277/188
[51] Int. Cl. ..................................... F16j 9/00,
 F16j 15/32
[50] Field of Search ............................. 277/188,
 165, 144, 190, 177, 176, 141, 143, 138

[56] References Cited
UNITED STATES PATENTS

| 2,739,855 | 3/1956 | Bruning | 277/188 |
|---|---|---|---|
| 2,765,204 | 10/1956 | Josephson | 277/188 |
| 2,998,987 | 10/1961 | Taschenberg et al. | 277/144 |
| 3,132,869 | 5/1964 | Campbell | 277/188 X |
| 3,218,087 | 11/1965 | Hallesy | 277/112 |
| 3,314,683 | 4/1967 | Schmidt et al. | 277/188 |
| 3,455,566 | 7/1969 | Hull et al. | 277/188 X |
| 3,473,814 | 10/1969 | Bastow | 277/188 |
| 2,934,363 | 4/1960 | Knox | 277/176 |
| 3,287,022 | 11/1966 | Soechting | 277/188 |
| 3,328,041 | 6/1967 | Bloom et al. | 277/165 |
| 3,418,001 | 12/1968 | Rentschler et al. | 277/165 |
| 3,394,941 | 7/1968 | Traub | 277/165 |

*Primary Examiner*—Samuel B. Rothberg
*Attorney*—Smyth, Roston & Pavitt

ABSTRACT: This disclosure describes a seal assembly for sealing between two relatively movable members. The seal assembly is positionable in a groove formed in one of the members and is sealingly engageable with the other of the members. The seal assembly includes a resilient sealing ring and, in the embodiment illustrated, first and second plastic sealing rings cooperable with the resilient sealing ring to form a fluid-tight seal.

INVENTOR:
Henry A. Traub

ATTORNEYS

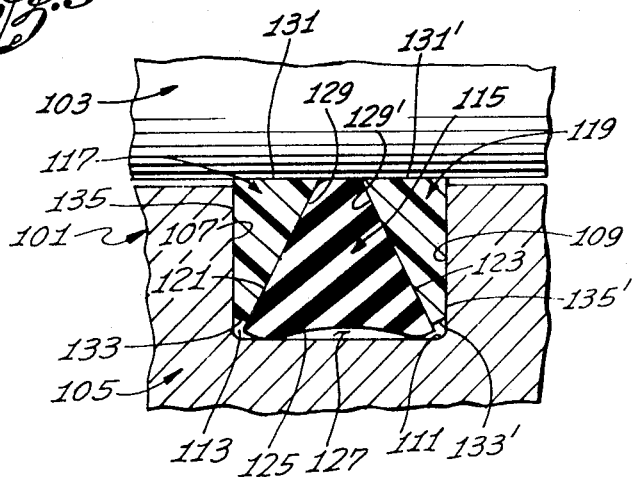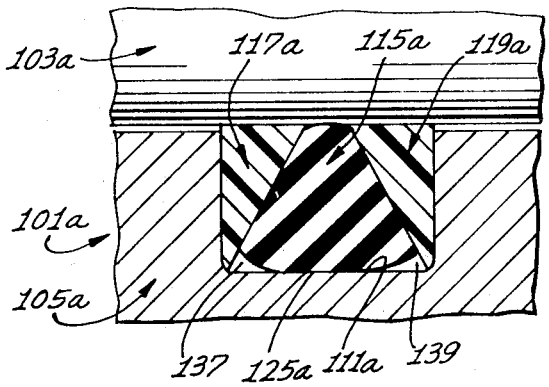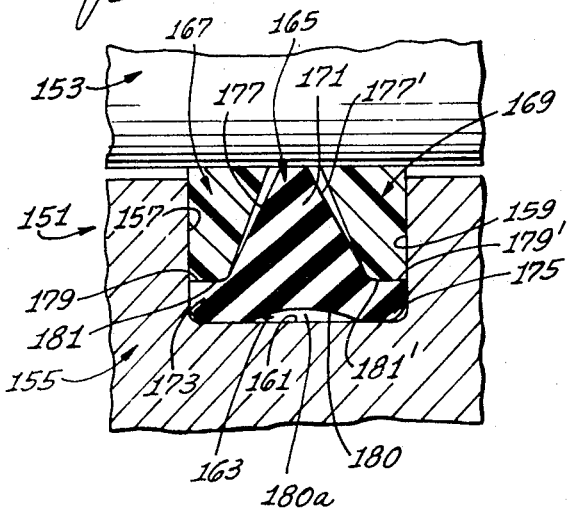

3,614,114

SEAL ASSEMBLY

BACKGROUND OF THE INVENTION

Seals of the type to which the present invention is directed are usually employed between two relatively movable inner and outer members which may be a rod or piston and an outer member such as a cylinder. Either the rod or the outer member have first and second circumferentially extending radial walls and a circumferential wall defining an annular groove for retaining the seal assembly. The seal assembly is provided in the groove and it engages both of the relatively movable members to provide a fluidtight seal between the movable members.

Prior art seal assemblies of this type usually provide just a single barrier against fluid leakage, and the single barrier has been found inadequate in many different kinds of seals. For example, one prior art seal includes an O-ring and a slipper seal. The seal assembly lies in a groove formed in one member and the slipper seal engages the adjacent relatively movable member. With this construction, a corner of the slipper seal may extrude into the clearance space between the members, and when this occurs, fluid under pressure can leak or blow by between the slipper seal and the member which it engages.

Another problem with prior art seals relates to the use of a resilient seal ring of T-shaped cross section. Such seals are subject to structural failure adjacent the juncture of the webs and flange due to high-column and flexing loading resulting from the radial compression of the central portion of the seal between the two relatively movable members. Such high-column loading and flexing of the central portion of the T-shaped seal is inherent when an interference fit of the resilient seal ring between the two members is desired.

SUMMARY OF THE INVENTION

The present invention provides a seal assembly which affords maximum opportunity for preventing leakage or blowby. According to one concept of the present invention, a resilient sealing ring and two separate slipper seals are provided in a groove in one member and the resilient sealing ring urges both slipper seals into engagement with the other member. Stated differently, the present invention teaches that by splitting of the slipper seal in a radial plane to form two separate slipper seal segments, the resultant seal assembly has substantially increased resistance to blowby. This result is unexpected because ordinarily one would expect to impair the sealing efficiency of a seal assembly by splitting one of the sealing rings.

Under normal operating conditions, the resilient ring will not urge the slipper seal segments into complete sealing engagement with the two members. Accordingly, fluid under pressure from the high-pressure side of the seal assembly can pass by the slipper seal segment on the high-pressure side and act on the resilient seal ring to dynamically load the latter to force the slipper seal segment on the low-pressure side into fluidtight sealing engagement with both of the relatively movable members. Should the high-pressure and low-pressure sides of the seal be reversed, the functions of the slipper seal segments would be reversed. Thus, the present invention utilizes a resilient sealing ring in combination with two unidirectional slipper seals.

If the slipper seal extrudes, it will extrude into the small clearance space between the two relatively movable members at one or both ends of the seal groove. Assuming that the slipper seal on the high-pressure side partially extrudes, this is of no significance because such slipper seal does not function as a seal when it is on the high-pressure side. However, should the high- and low-pressure sides be reversed so that, what was formally the high-pressure slipper seal now becomes the low-pressure side of the slipper seal, the extrusion thereof still does not prevent that slipper seal from forming an effective fluidtight seal. The reason is that the extruded tip always faces the low-pressure side of the sealing assembly when the slipper seal on which the tip is formed is in a sealing mode. Thus, by using two slipper seal segments or two slipper seals, the blowby problem resulting from partial extrusion of the slipper seal is eliminated.

As the slipper seal on the high-pressure side does not perform a sealing function, for those applications in which a unidirectional seal will suffice, the slipper seal on the high-pressure side need not be a seal. Rather it may be an element which will prevent rolling of the resilient ring and which will assist, if necessary, in preventing contact between the resilient ring and the relatively movable member.

Another advantage of the present invention is that the loading force on the slipper seal is applied to the high-pressure end portion thereof to thereby prevent the formation of a fluid wedge which would cause leakage through the seal assembly. This advantage is produced, in part, by positioning of the resilient ring adjacent to what will be the high-pressure end of each of the slipper seals when such slipper seal is in a sealing mode. The sealing capabilities of the slipper seal are further improved by the use of camming surfaces which engage the resilient seal ring.

Although the resilient seal ring may be of various shapes in axial cross sections, one preferred shape is a generally T- or hat-shaped cross section. With this arrangement, the resilient seal ring provides generally axially extending flanges upon which the slipper seal rings may be positioned, respectively.

The flanges are resiliently compressible and they act to urge the outer ends of the slipper seal rings into engagement with the member which such slipper rings engage. The central portion of the resilient seal ring urges the inner ends of the slipper seal rings into engagement with such member.

Where it is not desired to utilize slipper seals, the present invention provides two plastic sealing rings which are unsplit along an axial plane and which may be utilized in lieu of the slipper seal rings. When slipper seals are not utilized, the resilient seal ring preferably spans the gap between the end wall of the groove and the other of the relatively movable members to form a low-pressure seal. One advantage of this construction is that the resilient ring is generally more effective as a low-pressure seal than the plastic seals which must be strongly loaded in order to effect a tight seal.

The resilient seal ring normally biases each of the slipper seal rings toward sealing engagement with the other member; however, at low pressures, the primary sealing effect is obtained from the resilient seal ring itself. As pressure is increased, the pressure eventually becomes sufficient so that the resilient seal ring is tightly urged against the plastic seal ring on the low-pressure side of the seal. This results in the plastic seal ring on the low-pressure side of the seal being urged into tight sealing engagement with the end wall of the groove and with the other member to thereby form a second barrier for preventing leakage through the seal assembly. The resilient seal ring is preferably generally T-shaped in axial cross section with the flanges of the T resiliently urging the plastic seal rings into engagement with the other member.

To reduce the danger of failure of a resilient seal ring as a result of radial compression thereof, the present invention teaches that the circumferential surface of the resilient seal ring which confronts the circumferential wall of the groove can advantageously be arcuate in axial cross section. Preferably, the arcuate surface cooperates with the end wall to form a gap to thereby provide a space into which the material of the seal can move when a radial inward force is applied to the resilient seal ring. So that the resilient seal ring can resiliently oppose such radial inward force, this seal ring preferably has a pair of webs which are resiliently joined to a central portion of the resilient ring so that a radial inward force on the central portion causes a resilient yielding of the webs.

The invention, both as to its organization and method of operation together with further features and advantages thereof may best be understood by reference to the following description taken in connection with the accompanying drawings.

BRIEF DESCRIPTION OF THE DRAWINGS

FIGS. 5–7 are sectional views similar to FIG. 1 illustrating forms of the invention which are similar to those shown in FIGS. 1–3, respectively, except that the plastic seal rings of FIGS. 5–7 do not form slipper seal rings.

DESCRIPTION OF THE PREFERRED EMBODIMENTS

Figure 1:
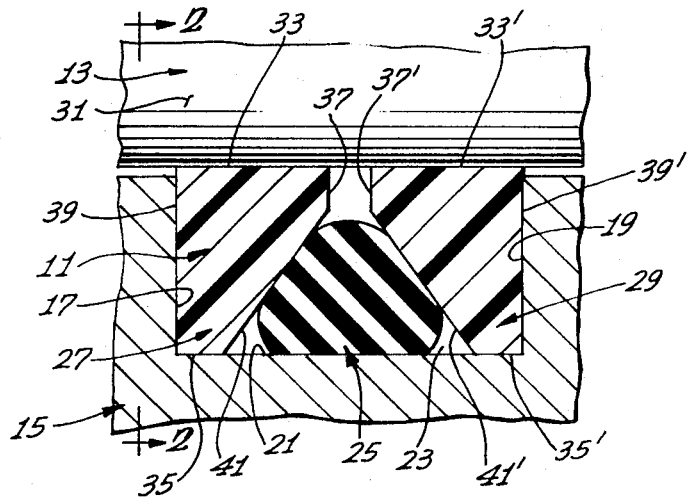
FIG. 1 is a typical, fragmentary, axial, cross-sectional view through a seal assembly and typical supporting structure therefor with the seal assembly being illustrated with no fluid pressure being supplied thereto.

Referring to the drawings and in particular to FIG. 1 thereof, reference numeral 11 designates a seal assembly constructed in accordance with the teachings of this invention. The seal assembly 11 is illustrated as being utilized with two relatively movable members in the form of a rod 13 and an outer member 15 which surrounds the rod and is concentric therewith. The member 15 has two axially spaced, circumferentially extending, radial walls 17 and 19 interconnected by a cylindrical circumferential wall 21. The walls 17, 19 and 21 define a groove 23 of generally rectangular cross section in which the seal assembly 11 is positioned.

Although the groove 23 is shown in the member 15, it could be provided in the rod 13, if desired. The rod 13 and the outer member 15 are moved relative to each other by any suitable apparatus (not shown) and the seal assembly 11 provides a fluidtight seal between the rod and the outer member.

The seal assembly 11 generally includes a resilient seal ring 25 and slipper seal rings or segments 27 and 29. The resilient ring 25 is preferably constructed of an elastomeric material such as rubber. The ring 25 completely encircles the rod 13 and, in the embodiment illustrated, is of generally circular cross section when it is completely unstressed. As shown in FIG. 1, with no fluid pressure acting on the seal assembly 11, the seal ring 25 is radially compressed between the slipper seals 27 and 29 and the end wall 21. The resilient ring 23 is held in tension circumferentially so that it tends to force the slipper seals 27 and 29 into right engagement with the peripheral surface 31 of the rod 13. The slipper seals cooperate to hold the resilient ring out of contact with the rod 13.

The slipper rings 27 and 29 are preferably constructed of a deformable plastic material having a relatively low coefficient of friction so that the friction between the slipper rings and the rod 13 is held to a minimum. Ordinarily, the material of the slipper segments 27 and 29 will be harder than the elastomeric material of the resilient ring 25. The slipper seals 27 and 29 are preferably constructed of a fluorocarbon such as polytetrafluoroethylene.

In the embodiment illustrated, the axial cross section of each of the slipper seals 27 and 29 is the mirror image of the other, although this relationship need not be maintained. The slipper seal 27 has an inner circumferential surface 33, an outer circumferential surface 35, an inner radial surface 37, an outer radial surface 39 and a cam surface 41 which extends diagonally between the radial surface 37 and the circumferential surface 35. The corresponding surfaces of the slipper seal segment 29 are designated by corresponding primed reference numbers. Each of the slipper seals 27 and 29 extend completely around the rod 13, and the inner radial surfaces 37 and 37' are preferably axially spaced so that each of the slipper rings can move completely independently of the other. The resilient seal ring 25 holds the circumferential surfaces 33 and 33' in engagement with the surface 31 of the rod 13. In the embodiment illustrated, the surface 41 is frustoconical; however, it could be curved in axial cross section or have a plurality of sections each with a different slope in axial cross section.

Assuming that the right-hand end of the seal assembly 11 as viewed in FIG. 1 is the high-pressure side, fluid under pressure is supplied to the slipper seal 29. The fluid under pressure (assuming that the pressure is sufficiently high) leaks between the radial wall 19 and the radial surface 39' and between the circumferential surface 35 and the circumferential wall 21 to act on the resilient ring 25. Fluid will also leak between the surface 33' and the rod 13 and between the rings 25 and 29. The fluid pressure acting on the resilient ring 25 causes the latter to apply a force to the cam surface 41 to thereby cam the slipper seal 27 into fluidtight sealing engagement with the surfaces 33 and 17.

The cam surface 41 extends axially outwardly as it extends toward the circumferential wall 21 and for this reason the force applied thereto by the resilient ring 25 and the fluid pressure causes the slipper seal 27 to be urged into fluidtight sealing engagement with the radial wall 17 and the peripheral surface 31 of the rod 13. Furthermore, the resilient ring 25 applies substantial force to the slipper seal ring 27 adjacent the inner radial surface 37 which faces the high-pressure side of the seal assembly 11. Thus, substantial force is applied to the slipper seal ring 27 at the high-pressure end thereof, and this is most desirable in preventing the formation of a fluid wedge. The seal assembly 11 can be utilized in an environment in which the high-pressure and low-pressure sides thereof are repeatedly changing. Thus, if high pressure were applied from the left as viewed in FIG. 1, fluid would leak past the slipper seal ring 27 to dynamically load the slipper seal ring 29 into fluidtight sealing engagement with the rod 13 and the radial wall 19.

Should a portion of the slipper seal ring 29 extrude between the rod 13 and the member 15 to form an extrusion tip, the fluid under pressure from the right end of the seal assembly 11 would tend to depress the slipper seal ring 29 sufficiently to provide a leakage path. With a conventional single slipper seal, the leakage path would extend completely through the seal assembly and blowby would occur. However, with the present invention, the leakage path extends only to the space between the slipper seals 27 and 29 so that this fluid can act on the resilient ring 25 to thereby urge the slipper ring 27 into fluidtight sealing engagement with the radial wall 17 and the rod 13.

Thus, with the present invention, the presence of an extrusion tip on the slipper seal 29 is of no consequence when the slipper seal 29 is on the high-pressure side of the seal assembly because the slipper seal 29 performs no sealing function at this time. However, should the relative pressures now reverse so that the left end of the seal assembly 11 is the high-pressure side, the presence of the extrusion tip on the slipper seal 29 will not impair its sealing ability in a direction from left to right in FIG. 1. That is, the presence of the extrusion tip on the low-pressure end of the slipper seal does not affect its sealing ability. Accordingly, the present invention prevents blowby even though an extrusion tip may be formed.

Figure 3:
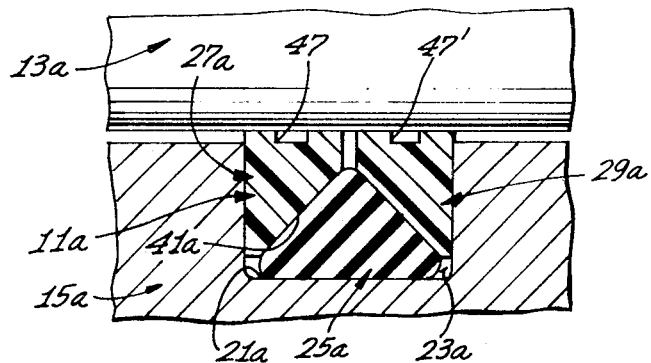
FIG. 3 is a typical sectional view similar to FIG. 1 illustrating a second embodiment of the invention.

FIG. 3 illustrates a seal assembly 11a which is identical to the seal assembly 11 except for the cross-sectional configuration of the resilient ring and for the presence of annular grooves 47 and 47' in the slipper seals 27a and 29a. Portions of FIG. 3 corresponding to portions in FIG. 1 are designated by corresponding reference characters followed by the letter a. In FIG. 3, the rod 13a and the member 15a may be identical to the rod 13 and the member 15. The resilient seal ring 25a is identical to the resilient seal ring 25 except that the former is of generally triangular configuration in axial cross section.

The slipper seal rings 27a and 29a are identical to the slipper seal rings 27 and 29, respectively, except for the dimensions of the various regions on the peripheral surface thereof and the presence of the grooves 47 and 47a which serve to break up any oil film on the rod 13a and to collect contaminants. The grooves 47 and 47a extend completely around the rod 13a. In addition, the seal rings 27a and 29a terminate substantially short of the circumferential wall 21a whereas the seal rings 27 and 29 terminate substantially at the circumferential wall 21. One advantage of the resilient ring 25a is that the inherent resiliency thereof loads the entire camming surface 41a and the corresponding camming surface of the slipper seal 29a. The operation of the embodiment of FIG. 3 is identical to the embodiment of FIG. 1 in that fluid leaks past the ring 29a and acts on all surfaces thereof and the ring 25a to dynamically load the ring 27a.

Figure 4:
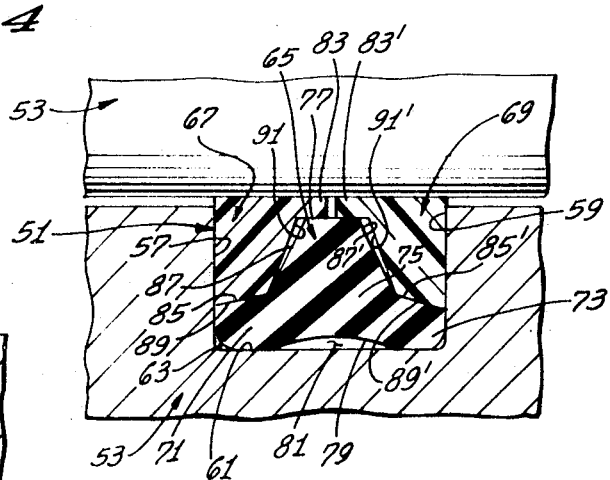
FIG. 4 is a view similar to FIG. 1 illustrating a third embodiment of the invention.
Figure 2:
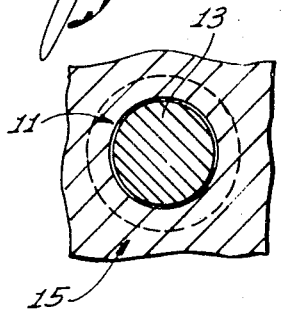
FIG. 2 is a typical sectional view on a radial plane through the supporting structure for the seal assembly of FIG. 1 with the seal assembly being illustrated in dashed lines.

FIG. 4 illustrates a seal assembly 51 for providing a seal between a rod 53 and a surrounding member 55. The rod 53 and the member 55 may be identical to the corresponding elements of FIG. 1 and to this end, the member 55 has two axially spaced radial walls 57 and 59 and a cylindrical circumferential wall 61 cooperating to define an annular groove 63 in which the seal assembly 51 is positioned.

The seal assembly 51 includes a resilient seal ring 65 and two slipper seals or slipper seal rings 67 and 69, all of which may be constructed of materials as described hereinabove with reference to FIG. 1. The resilient seal ring 55 is generally of hat or T-shape in axial cross section and includes a pair annular, axially projecting webs or flanges 71 and 73 and a central portion 75. The resilient ring 65 has an inner circumferential surface 77 and an outer circumferential surface 79 with a central region of the surface 79 being concave to define, with the end wall 61, a gap 81. As installed, the resilient seal 65 may be radially compressed with consequent reduction in the size of the concavity formed by the surface 79.

The gap 81 provides a space into which the elastomeric material may flow when it is subjected to compression. In addition, the flanges 71 and 73 are resiliently joined to the central portion 75 so that when the central portion is urged radially outwardly, the flanges resiliently yield to permit radial outward movement of the central portion into the gap 81.

The slipper seals 67 and 69 are, in the embodiment illustrated, mirror images of each other in axial cross section. Corresponding portions of the slipper seal ring 69 are designated by corresponding primed reference characters. The material for the slipper seal rings 65 and 67 may be as described hereinabove with reference to FIG. 1.

The slipper seal rings 65 and 67 rest on the upper surfaces of the flanges 71 and 73, respectively, and the slipper ring 67 has an axial flange 83 which separates the outer circumferential surface 77 of the resilient seal ring 65 from the rod 53. Thus, the resilient seal ring 65 is completely isolated from the rod 53 by the slipper seal rings 67 and 69.

The resilient ring 65 has cam surfaces 85 and 87 and 85' and 87' which are engageable with confronting similarly inclined cam surfaces 89 and 91 and 89' and 91', respectively, on the slipper seal rings 67 and 69. These cam surfaces cooperate to urge the slipper seal rings 67 and 69 into engagement with the rod 53 and to urge them axially away from each other.

With the seal assembly 51 installed as shown in FIG. 4, the central portion 75 thereof is held in radial compression by the circumferential wall 61 and the slipper seal rings 67 and 69. The flanges 71 and 73 constitute resiliently deformable feet which will permit radial movement of the central portion 75 toward the gap 81.

The operation of the embodiment of FIG. 4 is substantially the same as described hereinabove with reference to FIG. 1. Thus, with high-pressure fluid acting on the right of the seal assembly 51 as viewed in FIG. 4, fluid under pressure leaks past the slipper seal ring 69 to act along the full length of the wall 59 and the interface between the seal rings 65 and 69 to dynamically load the slipper seal ring 67. The cam surfaces 85, 87, 89, and 91 are operative along with the circumferential surface 77 to urge the slipper seal ring 67 into fluidtight sealing engagement with the rod 53 and the radial wall 57. The gap 81 provides a space into which the material of the resilient ring 65 can flow as it is subjected to heat and/or pressure. In addition, the resilient flanges 71 and 73 resiliently urge the slipper seal rings 67 and 69 into engagement with the rod 53. The concave portion of the circumferential surface 79 as well as the thickening of the resilient ring 65 by sloping of the surfaces 87 and 87', reduce the likelihood of structural failure of the resilient ring 65 adjacent the intersection of the surfaces 85 and 87.

FIG. 5 shows a seal assembly 101 which is similar to the seal assembly shown in FIG. 3 except that the resilient ring forms an interference fit between the two relatively movable members and the plastic rings do not function as slipper seals. Specifically, the seal assembly 101 provides a fluidtight seal between a rod 103 and a surrounding member 105, which may be of the type described hereinabove with reference to the other embodiments of the invention. The member 105 has two axially spaced radial walls 107 and 109 joined by a cylindrical circumferential wall 111 to define a groove 113 in which the seal assembly 101 is positioned.

The seal assembly 101 includes a resilient seal ring 115 and two plastic seal rings 117 and 119. The resilient seal ring 115 is generally triangular in axial cross section and may be constructed of materials as described hereinabove with reference to FIG. 1. The resilient seal ring 115 has cam surfaces 121 and 123 which extend away from each other in axial cross section as they extend away from the rod 103. The resilient ring 115 has a circumferential surface 125, at least a central portion of which is concave, to define a gap 127 with the end wall 111.

The resilient ring 115 may be considered to have a central portion and two flanges with the flanges touching the circumferential wall 111 and with the central portion engaging the rod 113. Preferably, the resilient seal ring 115 forms an interference fit between the circumferential wall 111 and the rod 103 to provide a fluidtight seal. The concave portion of the circumferential surface 125 functions in the substantially same manner as the surface 79 (FIG. 4) to resiliently load the seal 115 radially while reducing the likelihood of structural failure thereof.

The plastic rings 117 and 119 are the mirror image of each other in axial cross section and corresponding portions are designated by corresponding primed reference characters. The plastic rings 117 and 119 may be constructed of the same materials as the slipper seal ring 27. Unlike the conventional backup rings, the plastic rings 117 and 119 extend continuously circumferentially and completely around the rod 103. That is, each of the rings 117 and 119 is unsplit radially, so that it can form a seal with the rod 103.

The plastic ring 117 has a cam surface 129 which extends between an inner circumferential surface 131 and an outer circumferential surface 133. The plastic ring 117 has an annular radial surface 135.

With relatively low fluid pressure acting on the seal assembly 101 from the right as viewed in FIG. 5, the resilient seal 115 prevents leakage through the seal assembly. Although the plastic rings 117 and 119 are in engagement with the rod 103, the engagement is not sufficiently tight at low pressures to form an effective seal. As the pressure on the right of the seal assembly 101 builds up, it leaks past the plastic ring 119 and acts on all surfaces thereof and the ring 115 to dynamically load the plastic ring 117. This urges the plastic ring 117 into fluidtight sealing engagement with the rod 103 and the radial wall 107 of the groove 113. As the resilient ring 115 is still effective as a seal, the seal assembly 101 provides a double seal effect in that both the resilient seal 115 and the plastic seal ring 117 are in fluidtight sealing engagement with the rod 103 and the member 115.

FIG. 6 illustrates a seal assembly 101a which is quite similar to the seal assembly 101 and in which corresponding parts are designated by corresponding reference characters followed by the letter a. The seal assembly 101a is identical to the seal assembly 101 except that the former has a convex outer circumferential surface 125a which defines with the end wall 111a, gaps 137 and 139 into which the material from the resilient sealing ring 115a may flow when it is subjected to compressive forces and/or high temperatures. The convex circumferential surface 125a is superior to a flat surface in that it advantageously resiliently loads the resilient seal ring 115a radially. The operation of this embodiment is identical to the embodiment of FIG. 5.

FIG. 7 shows a seal assembly 151 which is very similar to the seal assembly shown in FIG. 4 except that the resilient seal ring of the former forms an interference fit between the two relatively movable members and the plastic seal rings are not slipper seal rings. The seal assembly 151 forms a seal between a rod 153 and a member 155. The member 155 has two axially spaced radial walls 157 and 159 and a cylindrical circumferential wall 161 defining a groove 163 in which the seal assembly 151 is positioned.

The seal assembly 151 includes a resilient seal ring 165 and two plastic seal rings 167 and 169. The resilient seal ring 165 is generally T- or hat-shaped in axial cross section and has a central portion 171 and annular axially extending flanges 173 and 175. The flanges 173 and 175 engage the circumferential wall 161 and the central portion 171 sealingly engages the rod 153 to form a fluidtight seal.

The resilient seal ring 165 has cam surfaces 177 and 177' which are identical to the cam surfaces 87 and 87' of FIG. 4. The resilient seal ring 165 has surfaces 179 and 179' which correspond to the surfaces 85 and 85' of FIG. 4; however, the surfaces 179 and 179' are flat in axial cross section, in the embodiment illustrated, and perform no camming function. The resilient ring has a partially concave peripheral surface 180 which defines a gap 180a.

The plastic rings 167 and 169 are identical in every respect to the rings 67 and 69, respectively, of FIG. 4, except that the former have no flanges 83 and 83' and the former have surfaces 181 and 181' which are flat in axial cross section and which perform no camming function. The operation of the seal assembly 151 is substantially identical to the operation of the seal assembly 101 (FIG. 5) and a double seal effect is obtained. The flanges 173 and 175 are resilient and function as described above with reference to FIGS. 4 and 5.

Although the seal assembly shown in the various embodiments hereof are illustrated as being retained in a groove formed in the member surrounding the rod, it should be understood that the groove may be formed in the rod, if desired. If this were done, the axial cross section of the seal assembly would be arranged so that the slipper seal rings or the plastic seal rings would engage the number in which the groove was not formed.

Although several embodiments of the invention have been shown and described, it will be apparent to those having ordinary skill in the art that various changes, modifications, and substitutions may be made without necessarily departing from the spirit and scope of this invention.

I claim:

1. A seal assembly for use between inner and outer relatively movable members wherein one of said members has first and second axially spaced radial walls and a circumferential wall cooperating with said radial walls and a circumferential wall cooperating with said radial walls to define a circumferentially extending seal groove for retaining the seal assembly, said seal assembly comprising:
   a slipper seal ring positionable in said groove adjacent said first radial wall, said slipper seal ring having a sliding surface slidingly engageable with the other of said members;
   slipper means positionable in said seal groove adjacent said second radial wall and adjacent the high-pressure side of the seal assembly, said slipper means having a sliding surface slidably engageable with said other member;
   resilient means positionable at least partially within said seal groove and at least partially intermediate said slipper seal ring and said slipper means for urging said sliding surfaces into engagement with said other member;
   means including at least one of said slipper seal ring and said slipper means for holding said resilient means out of substantial sliding contact with said other member;
   at least the portions of said slipper seal ring and said slipper means defining said sliding surfaces being of plastic material and having a relatively low coefficient of sliding friction with said second member, said slipper seal ring and said slipper seal means being substantially separate elements; and
   means defining a fluid passage to permit the fluid under pressure to leak by the slipper means from the high-pressure side of the seal assembly to dynamically load said slipper seal into fluidtight sealing engagement with said other member.

2. A seal assembly for use between inner and outer relatively movable members wherein one of said members has first and second axially spaced radial walls and a circumferential wall cooperating with said radial walls to define a circumferentially extending seal groove for retaining the seal assembly, said seal assembly comprising:
   a first slipper seal ring positionable in said groove, said first slipper seal ring having a sliding surface slidingly engageable with the other of said members;
   a second slipper seal ring positionable in said seal groove, said second slipper seal ring having a sliding surface slidably engageable with said other member;
   resilient means positionable at least partially within said seal groove for urging said sliding surfaces of said slipper seals into engagement with said other member, said slipper seals cooperating to hold said resilient means out of substantial sliding contact with said other member;
   the portions of said slipper seals defining said sliding surfaces being of plastic material and having a relatively low coefficient of sliding friction with said other member, each of said slipper seals acting independently to thereby provide two independent seals for sealing between the first and second members;
   the force of said resilient means being insufficient to hold both of said slipper seals in fluidtight sealing engagement with said other member when the seal assembly is subjected to relatively high pressures; and
   means defining a fluid passage so that the fluid under pressure can leak by the slipper seal on the high-pressure side of the seal assembly to dynamically load the other of said slipper seals into fluidtight sealing engagement with said other member whereby each of said slipper seals provides a unidirectional seal and each of the slipper seals are operative in different directions.

3. A seal assembly as defined in claim 2 wherein said resilient means within said seal groove includes an elastomeric sealing ring and each of said slipper seals is constructed of a deformable plastic.

4. A seal assembly as defined in claim 2 wherein said slipper seal rings are spaced apart axially.

5. A seal assembly for installation between an inner member and an outer member surrounding said inner member wherein one of said members has first and second axially spaced, circumferentially extending radial walls and a circumferential wall cooperating with said radial walls to define a generally annular seal groove for retaining the seal assembly, said seal assembly comprising.
   a resilient elastomeric ring positionable in the groove in engagement with the circumferential wall and surrounding the inner member;
   first and second slipper seals positionable in the groove closely adjacent the first and second radial walls, respectively, each of said slipper seals being a continuous, radially unsplit ring, each of said slipper seals being constructed of a relatively deformable plastic material having a low coefficient of friction, one of said elastomeric ring and both of said slipper seals surrounding the other of said elastomeric ring and both of said slipper seals;
   each of said slipper seals having a first surface engageable with the other of said members and a second surface engageable with the elastomeric ring, at least a portion of said elastomeric ring being generally between said slipper seals and urging said first surfaces of said slipper seals into engagement with said other member, said elastomeric ring being radially compressed between said second surfaces and the circumferential wall and being isolated from substantial contact with said other member by said slipper seals;

the elastomeric ring urging the slipper seals against said other members with insufficient force to form a fluid tight seal when fluid under a predetermined pressure is supplied thereto; and means defining a passage so that fluid can leak past the slipper seal on the high-pressure side and dynamically load the other of said slipper seals into sealing engagement with said other member whereby each of said slipper seals is substantially effective as a seal in a single direction.

6. A sealing assembly as defined in claim 5 wherein each of said slipper seals is constructed of polytetrafluoroethylene, said slipper seals being completely structurally disconnected to assure complete independence of movement.

7. A sealing assembly as defined in claim 5 wherein said second surface of said first slipper seal includes a cam surface which is inclined so that said elastomeric ring urges the first slipper seal toward the first radial wall and toward said other member.

8. A seal assembly as defined in claim 7 wherein said second surface of said second slipper seal includes a cam surface which is inclined so that said elastomeric ring urges the second slipper seal toward the second radial wall and toward said other member.

9. A seal assembly for installation between inner and outer relatively movable members wherein one of said members has first and second axially spaced radial walls and a circumferential wall defining a seal groove for retaining the seal assembly, said seal assembly comprising:

a resilient seal ring positionable in said groove of said one member, said resilient seal ring being generally hat-shaped in axial cross section and having first and second axially projecting flanges and a central radially projecting web;

slipper seal means positionable in said groove between said resilient seal ring and the other of said members and resiliently urgable by said resilient seal ring into sealing engagement with said other member, said resilient seal ring being held out of substantial contact with said other member by said slipper seal means, said slipper seal means having first and second end portions engageable with said first and second flanges, respectively, said flanges lying between the end wall and said slipper seal means and being radially compressed, said flanges urging said end portions into engagement with said other member to assist in forming a tight seal; and said slipper seal means being constructed of a relatively hard plastic material having a low coefficient of friction, said slipper seal means being continuous and unsplit circumferentially to thereby permit said slipper seal means to form a seal with said other member.

10. A seal assembly as defined in claim 9 wherein said resilient seal ring has an inner circumferential surface which is arcuate in axial cross section and which confronts the end wall to thereby provide additional resilience for the resilient seal ring in the radial direction.

11. A seal assembly as defined in claim 9 including means to permit fluid pressure loading of said resilient seal ring.

12. A seal assembly for use between inner and outer relatively movable members wherein one of said members has first and second axially spaced, radial walls and a circumferential wall defining a seal groove for retaining the seal assembly, said seal assembly comprising:

a resilient sealing ring of generally hat-shaped axial cross section, said resilient sealing ring in axial cross section having a central portion and first and second axially extending webs joined to said central portion;

said resilient sealing ring being positioned in said seal groove and having a circumferential surface confronting the circumferential wall of the seal groove, at least a central segment of said circumferential surface being spaced from said circumferential wall when said resilient sealing ring is unstressed radially to define a gap with said circumferential wall, said central segment having an end portion remote from said gap;

said webs being sealingly engageable with said circumferential wall adjacent said gap and being resiliently joined to said central segment so that when a force is applied to said end portion of said central segment in a direction toward said gap said webs resiliently yield to permit movement of said central segment generally radially to at least partially fill said gap to thereby reduce the compressive forces on said central segment to an amount less than that which would be experienced if said gap were not present;

a second sealing ring of harder material than the resilient sealing ring engageable with said resilient sealing ring and being sealingly engageable with the other of said members;

said end portion of said resilient sealing ring engaging at least one of said other member and said second sealing ring whereby said resilient sealing ring is held in radial compression and said sealing rings cooperate to provide an effective seal between said members; and said second sealing ring including a slipper seal ring and said end portion being engageable with said slipper seal whereby said slipper seal holds said resilient sealing ring out of substantial contact with said other member.

13. A combination as defined in claim 12 wherein said second sealing ring includes a slipper seal ring and said end portion is engageable with said slipper seal whereby said slipper seal holds said resilient sealing ring out of substantial contact with said other member.

14. A sealing assembly as defined in claim 12 wherein said resilient sealing ring and said second sealing ring have cooperating camming surfaces to permit said resilient sealing ring to cam said second sealing ring into engagement with said other member.

15. A sealing assembly as defined in claim 12 including a third sealing ring, said second and third sealing rings being positioned on opposite sides of said resilient sealing ring, respectively, each of said second and third sealing rings being constructed of a plastic material and being unsplit radially, each of said sealing rings being sealingly engageable with said other member and with said resilient sealing ring.

16. A seal assembly comprising:

slipper seal means of generally ringlike configuration, said slipper seal means having a first circumferential surface adapted to sealingly engage a member and a second circumferential surface defining a circumferentially extending cavity which diverges in axial cross section and which opens away from the first circumferential surface;

a resilient deformable ring seated in said cavity for resiliently urging the first circumferential surface into engagement with the member;

said slipper seal means being divided in a generally radial plane into independent slipper seal segments, said segments having inner surfaces at least portions of which are axially spaced apart to define fluid passage means;

said slipper seal segments cooperating to hold the resilient deformable ring out of contact with the member; and the slipper seal segments being constructed of a harder material than the resilient deformable ring and said first circumferential surface having a relatively low coefficient of friction.

17. A seal assembly as defined in claim 16 wherein the resilient deformable ring has a central portion 15 first and second flange portions projecting axially outwardly of the central portion, said central portion being received in said cavity and being thick radially relative to said flange portions, said slipper seal segments having radially thickened portions engageable, respectively, with said first and second flange portions.

18. A seal assembly as defined in claim 17 wherein said central portion and said slipper seal segments have cam surfaces which are inclined in axial cross section for urging said slipper seal segments axially outwardly and radially toward said member.